United States Patent [19]

Dials

[11] 3,968,417
[45] July 6, 1976

[54] CLOCK-RADIO WITH AUTOMATICALLY SELECTED BATTERY POWER

[75] Inventor: Donald Dials, San Rafael, Calif.

[73] Assignee: Lawrence Peska Associates, Inc., New York, N.Y. ; a part interest

[22] Filed: May 8, 1975

[21] Appl. No.: 575,808

[52] U.S. Cl. .................................. 320/2; 307/66; 58/23 BA
[51] Int. Cl.² ........................................ H02J 7/00
[58] Field of Search .................. 320/2; 307/64, 66; 58/23, 23 BA, 24, 35

[56] References Cited
UNITED STATES PATENTS 3,136,115  6/1964  Calabrese ........................ 320/2 X
3,818,272  6/1974  Rich ................................ 307/66 X Primary Examiner—J. D. Miller
Assistant Examiner—Robert J. Hickey

[57] ABSTRACT

A clock radio including, within the housing for the clock radio, a relay coil connected across a line cord for the clock radio, normally open relay contacts connected for passing power to the clock radio from the line cord and normally closed relay contacts connected for passing power from a battery to an inverter input. The inverter output is connected to the clock radio, whereby when line voltage is lost the clock radio is automatically powered by the battery.

1 Claim, 2 Drawing Figures

CLOCK-RADIO WITH AUTOMATICALLY SELECTED BATTERY POWER

FIELD OF THE INVENTION

The present invention relates generally both to clock radios or alarm clocks, and to systems for automatically selecting an emergency power source. In its more particular aspects, the present invention relates to the provision of a battery and an automatic switchover device therefor within the housing of an alarm clock or clock radio.

BACKGROUND OF THE PRESENT INVENTION

The modern population has become increasingly more dependent on clock radios and alarm clocks to awaken them from sleep at predetermined times. If even a brief lapse of electrical power should occur during the night, the result can be disastrous causing many people to oversleep and arrive late to their work, school or other activity.

While systems for automatic switchover to generator power or the like in the event of a power failure are well known, such systems because of their expense are used primarily only in such critical places as hospitals.

Furthermore, self contained units for emergency lighting are known which sense the line voltage and turn on emergency lights when no line voltage is present. Pat. No. 1,511,097 to Althoff et al is illustrative in this regard.

OBJECTS OF THE PRESENT INVENTION

It is an object of the present invention to provide within the housing of an alarm clock or clock radio a source of emergency power and apparatus for automatically engaging said emergency power source.

It is a further object of the present invention to provide a clock radio or alarm clock with a self contained emergency power source that is selected by inexpensive and simple means.

SUMMARY OF THE PRESENT INVENTION

Briefly, in the present invention, the aforementioned and other objects are satisfied by providing within the housing for an alarm clock (which term is herein considered to include a clock radio as well) a battery, and relay means having a coil connected across the power line cord for the alarm clock. Normally open relay contacts are connected between the power cord and the alarm clock while normally closed relay contacts are connected between the battery and the alarm clock. In this manner power from the line cord will pass to the alarm clock when line power is present and battery power will pass when line power is not present.

Other objects, features and advantages of the present invention will become apparent upon a perusal of the following detailed description of the preferred embodiment when taken in conjunction with the appended drawing wherein.

DETAILED DESCRIPTION OF THE PREFERRED EMBODIMENT

Figure 1:
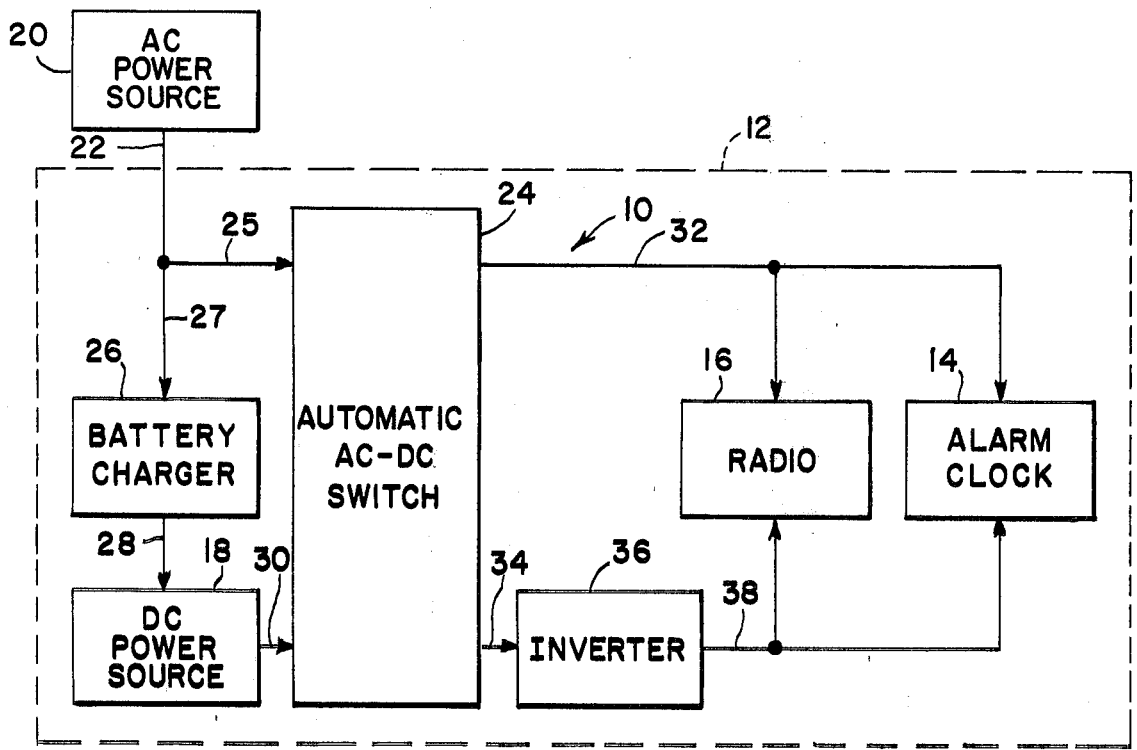
FIG. 1 is a block diagram of the alarm clock apparatus of the present invention including an automatic A.C. to D.C. switch.

Referring first to FIG. 1, the alarm clock apparatus 10 of the present invention comprises a self-contained unit within a housing 12 (diagramatically illustrated as a dashed box) which includes an alarm clock movement 14, a radio 16 in parallel with movement 14, and an internal rechargeable D.C. power source 18 such as alkaline batteries. Alarm clock 14 and radio 16 are usually powered from an external power source 20, such as available from a wall outlet via a line cord 22 which comprises means for connecting housing 12 to an A.C. wall outlet. However, in the event of a lapse of power in source 20 radio 16 and alarm clock 14 are powered from D.C. power source 18. D.C. power source 18 is automatically selected when A.C. power source 20 fails by automatic A.C.-D.C. switch 24 in a manner which will become completely apparent in connection with the discussion of FIG. 2.

A.C. power source 20 is fed both to switch 24, via lines 25, and to battery charger 26 via lines 27. Battery charger 26, whose output lines 28 are connected to D.C. source 18 is configured to constantly trickle charge source 18. The output lines 30 of D.C. source 18 are also fed to switch 24.

Switch 24 is provided with a pair of output line sets 32 and 34. Lines 32 are directly connected to the radio 16 and alarm clock movement 14 while lines 34 are connected to the input of an inverter or D.C. to A.C. converter 36. The output lines 38 from inverter 36 are connected to the radio 16 and alarm clock 14.

Switch 24 is configured to sense whether A.C. voltage is present on input lines 25. If sufficient voltage is present A.C. power is directed from input lines 25 to output lines 32. If sufficient voltage is not present, the path between lines 25 and lines 32 is interdicted and D.C. power is passed from input lines 30 to output lines 34 to power the radio 16 and clock 14 with A.C. power generated by inverter 36 in response to D.C. power on lines 34.

Figure 2:
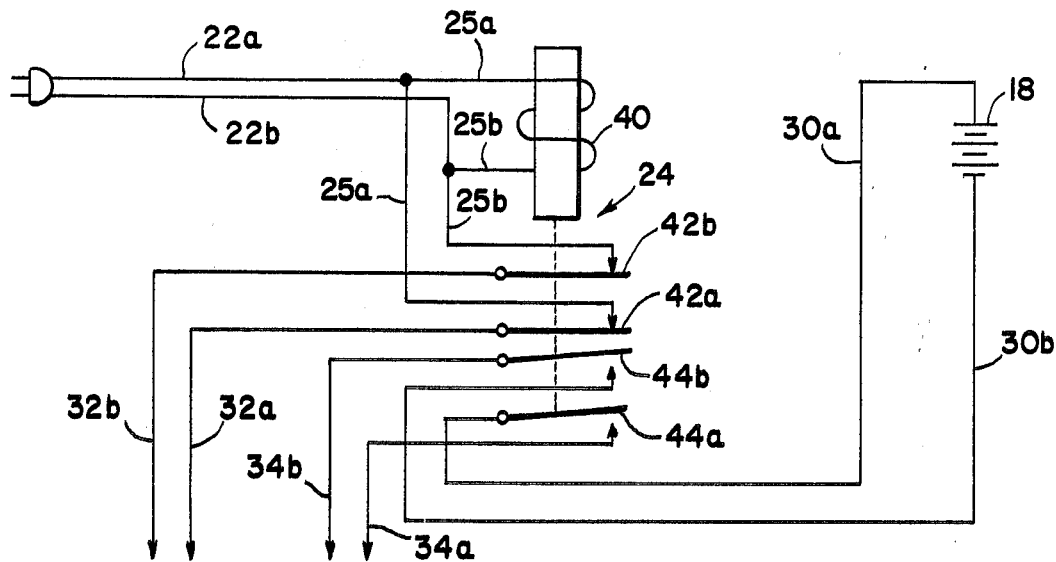
FIG. 2 is an electrical schematic of the switch of FIG. 1.

Referring next to FIG. 2, the manner of operation of switch 24 will become apparent. Switch 24 simply comprises a relay having a coil 40, normally open contacts 42a and 42b and normally closed contacts 44a and 44b electromagnetically controlled by coil 40. It should be mentioned that the terminology here being employed is that used in connection with relays and does not refer to the fact that voltage is normally present between the wires 22a and 22b comprising line cord 22. Thus normally open contacts 42a and 42b are open when the relay coil 40 is insufficiently energized via leads 25a and 25b from the line cord. The converse is true with respect to the normally closed contacts 44a and 44b.

It should now be apparent that interposed respectively between lines 25a and 25b, fed by line cord 22, and switch 24 A.C. output lines 32a and 32b are respectively the normally open contacts 42a 42b. Also interposed between the D.C. power source 18 output lines 30a and 30b and the switch 24 D.C. output lines 34a and 34b are respectively the normally closed contacts 44a and 44b. Therefore usually, when A.C. voltage is present from source 20, coil 40 is energized and contacts 42a and 42b are urged closed supplying A.C. power to radio 16 and clock 14 in FIG. 1. If line power lapses, contacts 42a and 42b open interdicting the circuit from the line cord 22 and contacts 44a and 44b close allowing D.C. power to pass to inverter 36 and converted therein to A.C. for powering the radio 16 and alarm clock 14.

While only one embodiment of the present invention is described herein it should be appreciated that numerous modifications are possible within the spirit and scope of the invention. For example, the invention may be utilized equally well with an alarm clock alone rather than a clock radio. Therefore, the term alarm clock is considered as generic to a clock radio.

What is claimed is:

1. In combination with alarm clock apparatus, a housing for said alarm clock apparatus, said housing being adapted to receive a battery and connecting means carried by said housing for drawing electric power from a wall outlet, the improvement within said housing comprising: a battery charger fed by said connecting means and having an output connected for charging said battery; an inverter adapted to be fed by said battery, said inverter having an output port connected to a power input port of said alarm clock apparatus; and means for applying power to said alarm clock apparatus from said connecting means when voltage is present on said connecting means and for applying power to said alarm clock apparatus from said battery via said inverter when voltage is not present on said connecting means, wherein said applying means comprises a single relay having a coil connected across said connecting means, said relay having normally open contacts connected between said connecting means and said power input port of said alarm clock apparatus, said relay also having normally closed contacts connected between said battery and an input port of said inverter.

* * * * *